Figure 1:
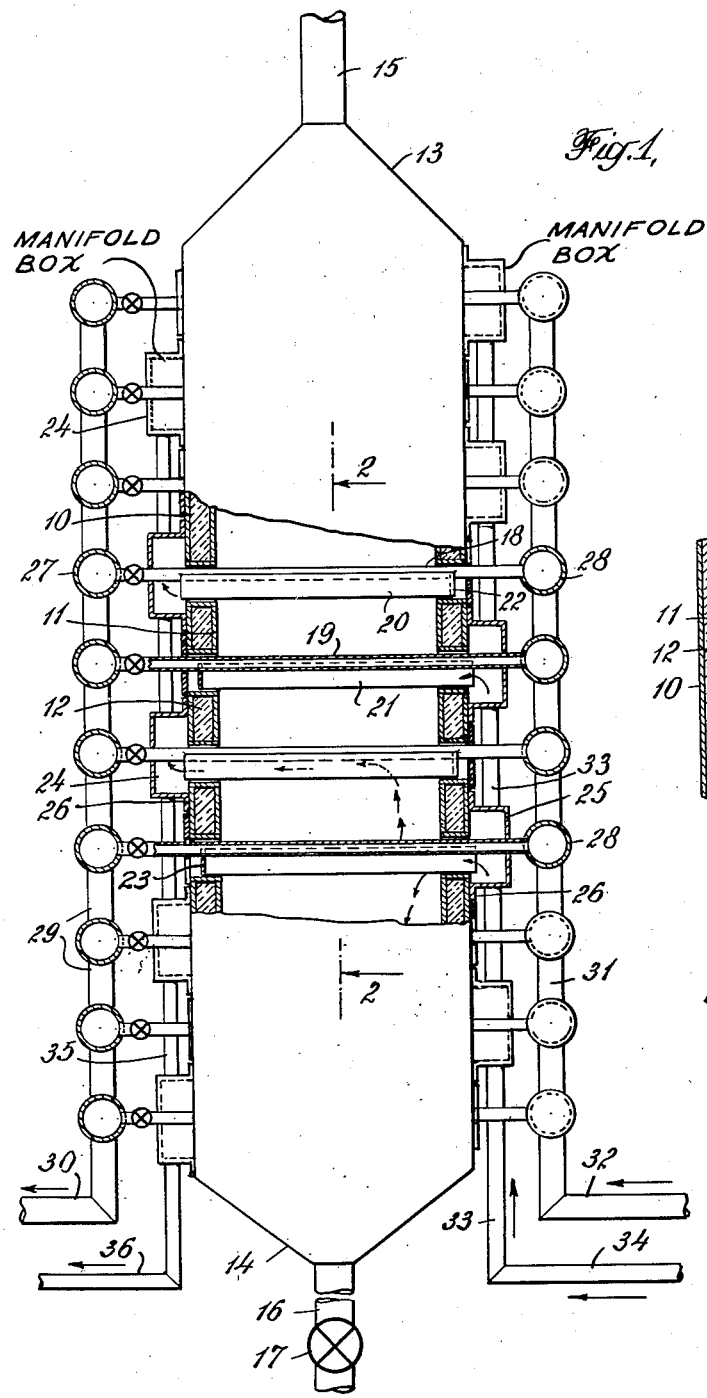

May 3, 1949.  J. A. CROWLEY, JR  2,469,329
APPARATUS FOR CONDUCTING REACTIONS IN
THE PRESENCE OF A SOLID MATERIAL
Filed Oct. 14, 1944  3 Sheets-Sheet 1

JOHN A. CROWLEY, JR.
INVENTOR

BY
ATTORNEY

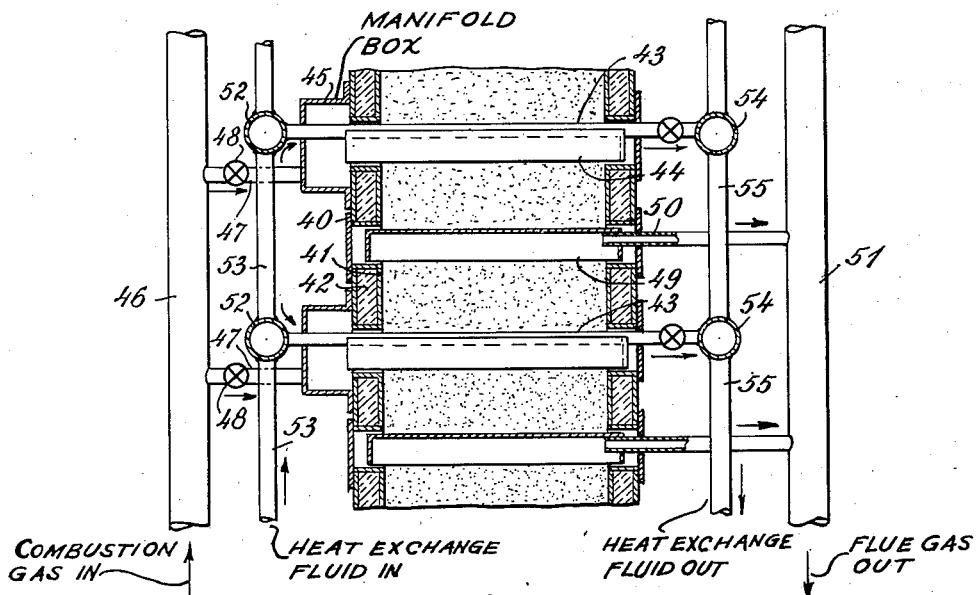
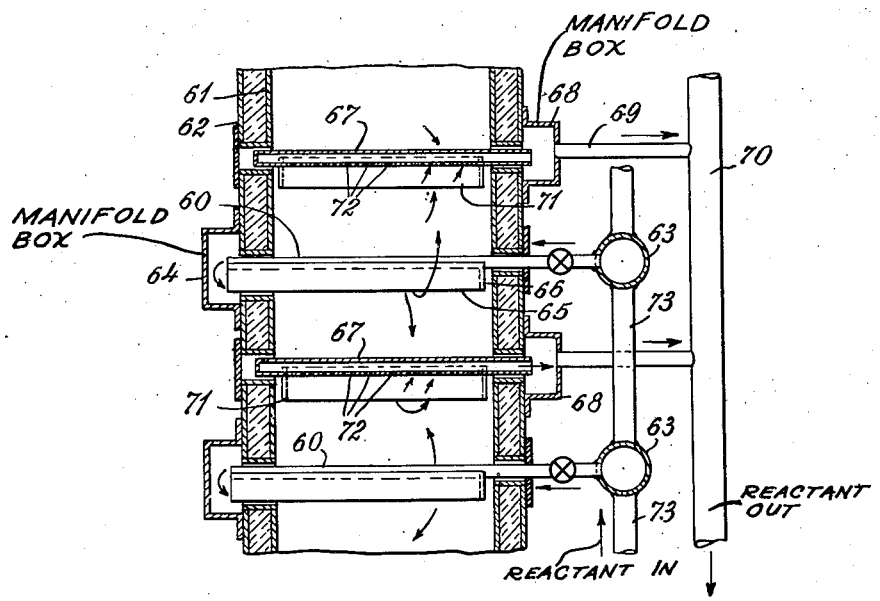

May 3, 1949.  J. A. CROWLEY, JR  2,469,329
APPARATUS FOR CONDUCTING REACTIONS IN
THE PRESENCE OF A SOLID MATERIAL
Filed Oct. 14, 1944  3 Sheets-Sheet 3
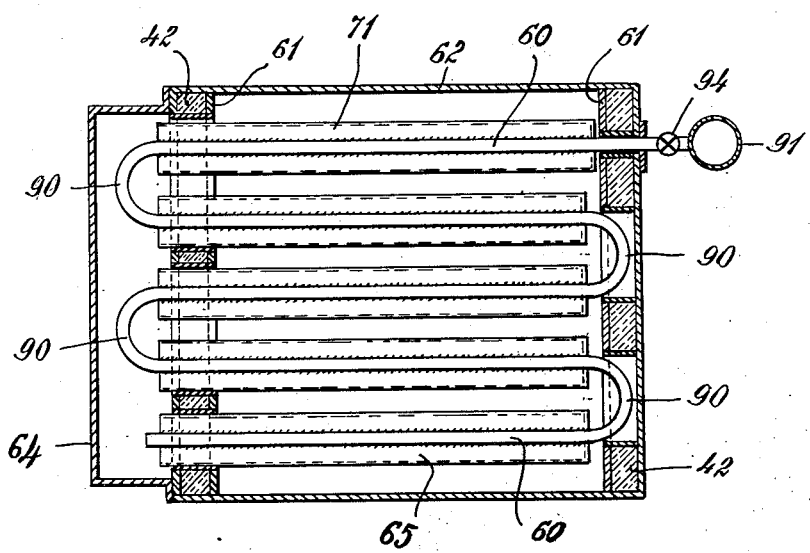
INVENTOR
JOHN A CROWLEY JR.
BY
AGENT OR ATTORNEY Patented May 3, 1949

2,469,329

UNITED STATES PATENT OFFICE 2,469,329

APPARATUS FOR CONDUCTING REACTIONS IN THE PRESENCE OF A SOLID MATERIAL

John A. Crowley, Jr., Scarsdale, N. Y., assignor to Socony-Vacuum Oil Company, Incorporated, a corporation of New York Application October 14, 1944, Serial No. 558,695

4 Claims. (Cl. 23—288)

This invention relates to processes wherein gaseous reactants are contacted with particle form solid materials at elevated temperatures for the purpose of thermochemical conversion. In such processes the solid material may or may not be catalytic in nature. Typical of such processes is the catalytic conversion of hydrocarbons and the subsequent regeneration of the catalytic material used therefor. It is well known that gas oils boiling in the range of 450° F. to 750° F. may be converted to gasoline and other products when contacted in the gaseous phase with particle form solid adsorbent materials at controlled conditions of temperature such as, for example, 800° F. and higher and pressures usually above atmospheric. The particle form solid adsorbent material may partake of the nature of natural or treated clays such as fuller's earth, Superfiltrol, which is a treated natural clay comprising mainly alumina and silica, bauxite or of various synthetic associations of alumina, silica or alumina and silica, any of which may have other constituents added such as certain metallic oxides. In a most recent form, this operation has been developed as one wherein a particle form solid contact mass material is passed cyclically as substantially compact columns through two vessels, in the first of which it is contacted with hydrocarbons in the gaseous phase for the purpose of conversion thereof and in the second of which it is subjected to the action of a combustion supporting gas acting to burn therefrom a carbonaceous contaminant deposited thereon in the hydrocarbon conversion vessel. In such a process the conversion of hydrocarbon gases is a net endothermic reaction and the combustion of the contaminant deposit is a net exothermic reaction, the one requiring the supply of heat from an outside source and the other requiring the removal of heat. The present invention is specifically directed to an apparatus both for handling and distributing the gas flow in such vessels as above described and for accomplishing heat exchange with the solid material passing through such vessels.

It has been common practice in the case of endothermic reaction vessels to supply the heat of reaction either by superheating the inlet reactant gases above the desired reaction temperature or by introducing the solid catalytic material to the upper end of the vessel at a temperature substantially above the desired reaction temperature, and permitting it to be cooled by the endothermic reaction to an outlet temperature from the lower end of the vessel which is substantially below the desired reaction temperature. Whereas such methods are satisfactory for reactions which are not strongly endothermic, they have distinct disadvantage when applied to many reactions. The principal disadvantage is that such a method of operation involves either subjecting the gaseous reactants to a conversion temperature above the desired reaction temperature during the initial period of the gaseous conversion, during which period the gaseous reactant will most readily react, thereby resulting in over conversion and the production of undesirable quantities of undesirable light products and excessive contaminant deposition on the solid material; or such method of operation involves subjecting the gaseous reactants to reaction temperatures substantially below the desired reaction temperature during the initial period of contact and to temperatures substantially thereabove during the final period of contact. This latter alternative would at first sight appear desirable, but in processes such as hydrocarbon conversion of heavy gas or fuel oils, the conducting of the initial portion of the reaction at low temperatures results in condensation of the higher boiling constituents of the charge with a resultant excessively high contaminant deposition on the solid material. Moreover, in many operations and especially multistage operations, products more uniformly conforming to the desired properties may be obtained by conducting the reaction approximately at the predetermined optimum reaction temperatures throughout rather than at temperatures which are both above and below such optimum.

When clay-type catalysts are regenerated, the temperature thereof must be controlled below a maximum temperature, above which it will be heat damaged. This maximum allowable temperature may be of the order of 1100° F. to 1400° F., depending upon the catalyst involved.

In processes involving the passage of such catalysts through a regenerator as a substantially compact column of particle form material, the excess heat of combustion may be removed by the provision of heat transfer tubes throughout the regenerator. In such an apparatus proper temperature control is obtained only by the use of a great amount of heat transfer surface requiring the maintenance of the solid material temperature reasonably near that of the heat transfer medium. Due to the difficulty of obtaining suitable heat exchange fluids which are stable at temperatures of 1000° F.–1200° F., for example, a large part of the solid material is maintained at somewhat lower temperatures during the entire regeneration. This is a disadvantage because generally the composition of the contaminant deposit changes as the regeneration progresses, and requires increasingly higher temperatures for its rapid combustion as the regeneration approaches completion. Often the temperatures required for complete and rapid removal of the last part of the contaminant are below those which will damage the solid material but above those obtainable in the apparatus above described. Moreover, although the combustion of a given contaminant might take place very rapidly at a temperature of 900° F., for example, in those sections of the regenerator near the air inlet where the oxygen content of the gas was high, yet the reaction might be very slow at this temperature in other sections of the regenerator where the oxygen, having been partly used, is substantially lower in partial pressure. If, however, higher temperatures of the order say 1000° F. to 1100° F. could be provided in those latter sections of the regenerator high combustion rates would be obtainable there also.

In order to avoid the disadvantages of regenerators of the above type and also to provide higher total gas throughput capacity, regenerators and reactors have recently been provided which consist of a series of alternate reaction and heat exchange stages, the reactant gas being passed in parallel through the reaction stages. The present invention differs in several respects from such multistage vessels and offers several advantages thereover. An important embodiment of the present invention involves the provision in a reaction vessel of a plurality of vertically spaced rows of combined heat transfer and gas handling elements extending horizontally across said vessel, so as to provide heat transfer surface within a portion of the reaction zone sufficient to permit control of the solid material temperature range while at the same time providing a large remaining portion of the reaction zone between said rows of elements wherein the reaction may proceed in the absence of proximate heat transfer surface.

A major object of this invention is the provision of an apparatus of simple construction and high gaseous throughput capacity wherein gaseous reactants may be contacted with a particle form solid material for the purpose of thermochemical conversion while controlling the solid material temperature between predetermined temperature ranges throughout the reaction zone without the requirement of a plurality of separate independent heat exchange stages and without the requirement of proximate heat transfer surfaces throughout all sections of the reaction zone.

Another object of this invention is the provision of a combined heat transfer and gas handling element adapted for use in such an apparatus as the above.

Another object of this invention is the provision in a process for conversion of hydrocarbons in the gaseous phase in the presence of particle form solid contact mass materials, of an apparatus for controlling the gaseous reactant and solid material temperature within a narrow preferred range of temperatures throughout the reaction zone and especially in the vicinity of the gas inlets to the reaction zone.

Another object of the invention is the provision in a process for regeneration of a contaminant bearing particle form solid contact mass material by the action of a combustion supporting gas, of an apparatus wherein sufficient heat may be removed from the solid material in those sections of the regeneration zone wherein the regeneration gas is fresh to control the solid material temperature within predetermined limits throughout the entire regeneration zone without the requirement of proximate heat transfer surfaces in these sections of the regeneration zone wherein the combustion supporting gas is relatively spent.

These and other objects of this invention will become apparent from the following description of this invention. Before proceeding with said description certain terms used herein should be defined. The terms "gas" or "gaseous material" as used herein and in the claiming of this invention are intended to cover any material in the gaseous phase at the temperature of the operation or reaction regardless of its normal phase at atmospheric temperature. The words "tube" or "tubes" are intended as covering not only circular conduits but conduits of any other contour.

Figure 2:
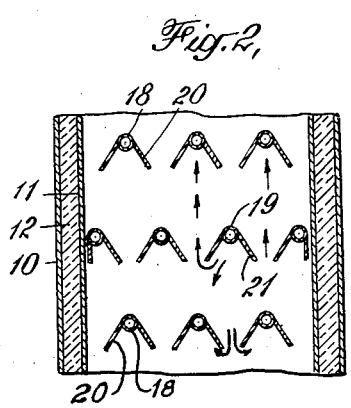
Figure 3:
Figure 4:
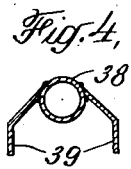

Referring now to the drawings, Figure 1 is an elevational view, partially in section, showing a reaction vessel constructed according to this invention. Figure 2 is a vertical sectional view taken along line 2—2 in Figure 1, Figure 3 is an enlarged sectional view of one of the combined heat transfer and gas handling elements used in the apparatus of Figure 1, Figure 4 is a sectional view of a modified form of such an element, Figure 5 is an elevational view, partially in section, of a vertical section of a vessel which embodies a preferred modification of this invention adapted for catalyst regeneration, and Figure 6 is a similar view of another preferred modification of this invention adapted especially for hydrocarbon conversion, and Figure 7 is a cross-sectional view of a modification in the construction of the vessel shown in Figure 6, taken at line 7—7 of Figure 6. All of these drawings are highly diagrammatic in form.

Turning now to Figure 1, we find 10 is the outer shell of a vertical reaction vessel which may be circular or rectangular in cross-sectional contour, 11 is the inner shell thereof and 12 is a layer of insulating material between the two shells. The shell 10 is closed on its upper end by the converging section 13 and on its lower end by converging section 14. An inlet conduit 15 for solid material is connected into the upper section 13 and an outlet conduit 16 having throttle valve 17 thereon is depended from the lower section 14. A plurality of vertically spaced rows of horizontally spaced and horizontally extending tubes 18 and 19 extend across the vessel and through the opposite walls thereof. Two similar fins are attached as by welding along the length of each tube on either side thereof and extend downwardly and outwardly therefrom, so as to provide a solid material-excluding gas space extending along underneath each tube. The fins 20 on tubes 18, which join alternate rows, terminate within the vessel short of the outer shell on one end and plates 22 are provided across the ends of each set of fins on each tube. These fins extend through the vessel shell on the opposite end into the gas outlet manifold box 24 which is attached along the shell, thus communicating each alternate row of gas spaces joined by tubes 18 and fins 20 with a gas outlet manifold box. The fin arrangement on the remaining alternate rows 19 of tubes is similar to that above described except that the fins terminate within the vessel and are provided with end plates 23 on the opposite end and extend through the opposite wall of the vessel into gas outlet manifold boxes 25 which extend horizontally across the shell and are attached thereto by flanges 26.

The arrangement may be more clearly understood by reference to Figure 2 which is a sectional view along line 2—2 of Figure 1 and in which like members bear like numerals. It will be seen from Figure 2 that the tubes 19 are offset horizontally so as to lie in the vertical plane between adjacent tubes 18 in the rows above and below. In the vessel shown, the cross-section was such as to require four tubes in some rows and only three in others, in order to provide uniform tube and fin distribution across the vessel cross-section. The invention is not to be limited, however, to such proportion. It will also be noted that the outside fins, on the end tubes in the rows containing four tubes, extend substantially vertically downward.

Turning again in Figure 1, the rows of tubes terminate on one end in horizontal outlet headers 27, which are provided for each row, and on their opposite ends in horizontal inlet headers 28, also provided for each row. The outlet headers are interconnected by riser pipes 29 to the lowermost of which is connected the main outlet conduit 30; and the inlet headers are interconnected by riser pipes 31 to the lowermost of which is connected the main inlet conduit 32. Similarly, the gas inlet manifold boxes 25 are interconnected by riser pipes 33 to the lowermost of which is connected the main gas inlet conduit 34, and the outlet manifold boxes 24 are interconnected by riser pipes 35 to the lowermost of which the main gas outlet pipe 36 is connected.

In operation particle form solid material at the desired reaction temperature enters the vessel through conduit 15 and passes downwardly therethrough as a substantially compact column. The solid material is prevented from channeling downwardly in any given vertical path by the staggered arrangement of the alternate rows of tubes and fins. Contacted solid material is withdrawn from the lower end of the vessel through conduit 16, the rate of withdrawal being controlled by throttle valve 17. Gasiform reactants at the desired reaction temperature enter through conduit 34 and riser pipes 33 into the several inlet manifold boxes 25. The gas is then distributed into the several vertically spaced rows of gas spaces provided by tubes 19 and fins 20. From these gas distributing spaces the reactant gas passes upwardly and downwardly through the solid material toward the nearest rows of gas collecting spaces formed by tubes 18 and fins 20. The gas then disengages from the solid material and collects in these latter gas spaces and passes therefrom into outlet manifold boxes 24 and then through pipes 35 to the main gas outlet conduit 36. There are thus provided a series of superimposed reaction zones wherein the vertical direction of gas flow is opposite in successive zones. The solid material temperature is controlled by supply of a heat exchange fluid through conduit 32, riser pipes 31 and manifolds 28 to the heat transfer tubes 18 and 19. The heat exchange fluid passes from the opposite ends of the tubes into manifolds 27, and thence through pipes 29 to the main outlet conduit 30. Thus the solid material temperature is adjusted at a plurality of levels along the vessel, by indirect heat transfer with a heat exchange fluid, the temperature adjustment being sufficient at each level to prevent the solid material temperature from rising or falling beyond a predetermined limit during its passage between heat exchange levels. Such an apparatus when used for a hydrocarbon conversion process permits very high reactant throughput capacity and permits accurate control of the reaction temperature throughout the reaction zone and especially during the initial and final interval of the gaseous reactant contact with the solid material. Such temperature control not only reduces the amount of contaminant deposit to a minimum but also permits optimum conversion yields and product properties.

The combined heat transfer and gas handling element permits a substantial reduction in the total metal required within the conversion vessel. This is apparent when it is considered that on the one hand the fins which define the gas distributing and collecting spaces also serve as additional heat transfer surfaces thereby reducing the total number of heat transfer tubes required, while on the other hand, the heat transfer tubes serve both to help define the gas distributing and collecting spaces and also to support the fins. Figure 3 is an enlarged sectional view showing the construction of the combined heat transfer element and gas handling elements used in the apparatus of Figure 1; like numerals are used for like members. In some operations larger gas spaces are desirable in which case the fin shape and size may be varied. Such a modified form is shown in Figure 4. In Figure 4, the element is comprised of a circular tube 38 and two angle shaped fins 39, one welded along either side of the tube. When tubes of relatively large diameter are employed, fins attached along their sides and extending substantially vertically downward may be used. Moreover, if desired, tubes of cross-sectional shapes other than circular may be used. In some modifications, it may be desirable to interconnect the ends of adjacent tubes in each row so as to provide a continuous coil for heat exchange fluid flow in each row of tubes. Such a modification is particularly desirable when a relatively great change in the temperature of the heat exchange fluid is desired.

In some applications of the invention the use of heat transfer tubes at both the levels of gas inlet and gas outlet is not necessary. Such a modification is shown in Figure 5 wherein is shown a vertical view, partially in section, of a vertical section of a regenerator vessel. The vessel is of generally the same type as that shown in Figure 1 except for internal modifications as described hereinafter. In Figure 5, 40 represents the outer shell of the vessel, 41 the inner shell and 42 the insulator therebetween. Heat transfer tubes 43 having fins 44 attached along their length are provided in a plurality of vertically spaced rows across the vessel. These elements serve as combined gas inlet distributing and heat transfer elements similarly to those shown in Figures 1 and 2, gas inlet manifold boxes 45 being provided along one side of the vessel shell. A main gas inlet riser pipe 46 is provided from which gas is distributed through pipes 47 having valves 48 thereon into the several inlet manifold boxes. Intermediate the rows of combined heat transfer and gas distributing elements, rows of inverted angle shaped troughs 49 are positioned across the vessel. These channel members are closed on either end and terminate within the vessel short of the external shell. These channels serve as gas collectors and gas is removed therefrom through pipes 50 which extend through the vessel shell and a short distance under the collectors on one end and each of which pipes 50 is connected into the gas outlet duct 51 on the opposite end. The heat transfer tubes connect on their inlet ends into inlet manifolds 52 which are interconnected through pipes 53; and the heat transfer tubes are connected on their outlet ends into manifolds 54 which are interconnected through outlet riser pipes 55. The construction is thus such as to divide the regenerator into a series of superimposed stages wherein the gas flow is alternately vertically upward and downward through the solid material column flowing therethrough. The solid material temperature is adjusted only in that section of the vessel in the immediate vicinity of the gas inlets in which section the regeneration gas, for example, air, is fresh. Thus the solid material in passing by a given row of heat transfer tubes may be cooled from a temperature of 1100° F. to a temperature of 1000° F., and may then be heated in the section of the regenerator between rows of tubes back to 1100° F. by the heat liberated by contaminant combustion. The temperature of the solid material passing by the gas collectors where the air is relatively spent may be of the order of 1050° F. Thus by permitting the combustion reaction to proceed at a somewhat higher temperature and in the absence of proximate heat transfer surfaces in those sections of the regenerator wherein the air is relatively spent than in those sections wherein the air is fresh, a high and uniform rate of contaminant combustion is provided throughout the regenerator resulting in higher overall burning capacity and efficiency. The above described regeneration process is claimed in my co-pending application Serial Number 37,633, filed in the United States Patent Office July 8, 1948.

Another modification of the invention particularly adapted for hydrocarbon conversion is shown in Figure 6 which is a vertical view, partially in section, of a vertical section of a reactor. This vessel may be of the same general construction as that shown in Figure 1, except for internal modifications as shown and except for provision for sealing either end of the vessel with an inert gas, which provision is now conventional and not shown. Within the vessel shown in Figure 6 are positioned a plurality of vertically spaced rows of tubes 60 which extend through the inner shell 61 and outer shell 62 of the vessel on opposite ends, one end of the tubes in each row connecting into the horizontal inlet manifolds 63 and the opposite open end terminating within the closed header box 64 which is attached horizontally along the outer vessel shell adjacent the row of tubes. Fins 65 are attached along the tubes 60 similarly to those shown heretofore, each pair terminating within the vessel on one end, said end being closed by plate 66, and terminating within the header box 64 on the opposite end. Also positioned within the vessel are vertically spaced rows of tubes 67 located intermediate the rows of tubes 60. Each of tubes 67 is closed on one end which extends through the inner shell 61 of the vessel and terminates short of the outer shell thereof so as to be supported on the insulation casing. The opposite end of each tube 67 extends through the vessel shell into outlet manifold boxes 68 attached along the vessel shell adjacent each row of tubes 67. Outlet pipes 69 extend between each of said outlet manifold boxes and a main outlet conduit 70. Fins 71 similar to those shown hereinbefore are attached along the tubes and terminate with closed ends within the vessel. Perforations 72 are provided along the underside of the tubes to permit gaseous passage from the gas collecting spaces thereunder into the tubes.

When operated for hydrocarbon conversion, gasiform hydrocarbon charge superheated to a temperature above the desired catalytic conversion temperature but below that at which substantial thermal cracking will occur enter from a heating furnace (not shown) and inlet conduit into riser pipes 73 from which it distributes into 63 and flows therefrom in parallel through the several rows of tubes 60 wherein it is cooled by indirect heat transfer with the solid material passing through the reactor to a temperature equal to the desired conversion temperature or only slightly thereabove, the gases then pass from the ends of the tubes into closed header boxes 64 and then into the gas distributing spaces formed between the fins 65. The gas then flows from the gas distributing spaces upwardly and downwardly through the solid material within the reactor to the nearest rows of collector elements. The gas disengages from the solid material, and enters the gas collector spaces provided by tubes 67 and fins 71 and then passes into the tubes through the perforations 72 therein. The gaseous reaction products then pass from the outlet tubes into outlet manifold boxes 68 and then through pipes 69 into the main outlet conduit 70 through which they pass to a suitable product recovery system (not shown). The solid material passing downwardly through the reactor as a substantially compact column is maintained within a limited range of temperatures reasonably close to the desired conversion temperature throughout the conversion vessel by transfer thereto of the heat necessary for the endothermic conversion through the metal of each row of tubes 60 and fins 65. By such continuous readjustment of the solid material temperature in the vicinity of each reactant inlet and by the adjustment of the reactant gas inlet temperature before its contact with solid material, the temperature of reaction during the initial period of reactant gas contact may be controlled with especial accuracy thereby avoiding excessive contaminant deposition and/or excessive uncontrolled initial conversion which would otherwise occur. This is accomplished without the requirement of substantially more metal than would be required for vapor distribution and collection without heat exchange provision, and the heat exchange is provided without the requirement of a separate heat exchange system and fluid. Moreover the construction shown permits easy access to the gas inlet and outlet tubes for the purpose of cleaning or removing them individually or collectively. It will be apparent that with the above apparatus the temperature of the solid material could be varied upwardly or downwardly as the solid material passes through the reaction vessel, by independent adjustment of the temperature of the inlet reactant to each row of heat transfer tubes.

As has been mentioned hereinabove in some operations such as the hydrocarbon conversion operation just described, it may be desirable to connect the adjacent ends of the tubes of each row thereof to provide in each row a continuous coil. Such an arrangement is shown in Figure 7 which is a cross-sectional view of an apparatus similar to that in Figure 6 taken at a level just above and looking down on a row of tubes 60 except that while in Figure 6 the heat transfer tubes are arranged for parallel flow of inlet reactants, in Figure 7, the tubes 60 are arranged for series flow of reactants. Thus the proper ends of the adjacent tubes 67 are connected together by means of U-bends 90 so that reactants enter one of the end tubes from manifold 91 through valve 94 and pass serially through the tubes to issue from the open end of the end tube on the opposite side of the vessel into header box 64 which extends horizontally across the outside of the vessel shell 62. The vapor then distributes throughout header box 92 and passes therefrom under the gas distributing spaces formed by fins 65 which distributing spaces are in free gas flow communication with the interior of header box 64.

The above described process is the subject of claims in my co-pending application Serial Number 37,634, filed in the United States Patent Office July 8, 1948.

This invention is not limited to the particular structure, modifications, operation or applications herein disclosed, since alternative structures and modification of the invention will be apparent to those skilled in the art from the above description.

I claim:

1. An apparatus for conducting thermochemical reactions comprising an elongated substantially vertical vessel; means to introduce particle form solid material to the upper end of said vessel, means to withdraw solid material from the lower end thereof, throttling means associated with said withdrawal means to permit control of the solid material flow so as to maintain a substantially compact column thereof within said vessel, a plurality of tubes extending horizontally across said vessel, fins attached along the length of each of said tubes so as to depend downwardly therefrom thereby providing substantially solid material free gas spaces below said tubes, means to introduce reactant gas into said gas spaces, a plurality of means to withdraw gas from said vessel spaced apart from said gas spaces, and means to pass a heat exchange medium through said tubes.

2. An apparatus for catalytic conversion of hydrocarbons comprising: a substantially vertical, closed vessel adapted for confining a substantially compact column of particle form solid catalytic material, means to introduce said solid material to the upper end of said vessel and means to withdraw it from the lower end thereof, a plurality of vertically spaced substantially horizontal rows of tubes extending across said vessel, two downwardly extending ribs attached along the length of each of said tubes so as to provide gas spaces extending thereunder along their length from which gas spaces solid material flow is excluded and which gas spaces are in free gaseous communication with said solid material in said vessel, means to introduce superheated hydrocarbon charge vapors to one end of each of said tubes, means communicating the opposite end of said tubes with said gas spaces thereunder so as to permit gas flow into said gas spaces, means to withdraw gaseous reaction products from said vessel at levels intermediate said rows of tubes.

3. The apparatus of claim 2 wherein said gas collecting members comprise tubes extending horizontally across said vessel and having perforations through their lower sides, and fins attached along said tubes similarly to those on said cooling medium tubes, said perforated tubes being connected to said means to withdraw gas.

4. In a reaction vessel adapted for conducting gaseous conversion of hydrocarbons in contact with a substantially compact moving column of particle form solid contact mass material, a combined heat transfer and gas distributing assembly comprising: a plurality of vertically spaced rows of tubes extending horizontally across said vessel, means communicating the ends of adjacent tubes in each row so as to form a continuous series coil in each row, two fins attached along the length of each tube and extending downwardly and outwardly therefrom at an angle with each other so as to provide a gas space along the underside of each tube, means to pass preheated hydrocarbon charge gases through said coils in each row, means to separately direct the effluent charge gases from each coil in parallel to the corresponding gas spaces under each tube comprising said coil.

JOHN A. CROWLEY, Jr.

REFERENCES CITED

The following references are of record in the file of this patent:

UNITED STATES PATENTS

| Number | Name | Date |
|---|---|---|
| 558,508 | Metcalf | Apr. 21, 1896 |
| 731,682 | Hillig | June 23, 1903 |
| 1,799,858 | Miller | Apr. 7, 1931 |
| 1,852,227 | Barstow | Apr. 5, 1932 |
| 2,320,562 | Bransky | June 1, 1943 |
| 2,350,644 | Simpson | June 6, 1944 |
| 2,362,621 | Fahnestock | Nov. 14, 1944 |
| 2,364,453 | Laying et al. | Dec. 5, 1944 |
| 2,376,365 | Lassiat | May 22, 1945 |
| 2,386,670 | Evans | Oct. 9, 1945 |